(12) United States Patent
Malapati et al.

(10) Patent No.: US 12,036,903 B1
(45) Date of Patent: Jul. 16, 2024

(54) VEHICLE SEAT WITH RESTRAINT SYSTEM

(71) Applicant: Ford Global Technologies, LLC, Dearborn, MI (US)

(72) Inventors: Srinivas Reddy Malapati, Novi, MI (US); Mangesh Kadam, Canton, MI (US); Yuqin Zhao, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/340,126

(22) Filed: Jun. 23, 2023

(51) Int. Cl.
| *B60N 2/427* | (2006.01) |
| *B60N 2/02* | (2006.01) |
| *B60R 21/207* | (2006.01) |
| *B60R 21/264* | (2006.01) |

(52) U.S. Cl.
CPC ....... *B60N 2/42754* (2013.01); *B60N 2/0224* (2013.01); *B60R 21/207* (2013.01); *B60R 21/264* (2013.01)

(58) Field of Classification Search
CPC . B60R 21/207; B60R 21/264; B60N 2/42754; B60N 2/0224
See application file for complete search history.

(56) References Cited

U.S. PATENT DOCUMENTS

| 6,120,082 | A  | * | 9/2000 | Vandermolen | ......... | B60N 2/508 |
| | | | | | | 296/68.1 |
| 9,809,136 | B2 | * | 11/2017 | Haller | .................... | B60N 2/508 |
| 9,994,138 | B2 | | 6/2018 | Whitens et al. | | |
| 10,654,381 | B2 | * | 5/2020 | Lorey | ..................... | B60N 2/502 |
| 10,926,676 | B2 | * | 2/2021 | Dotzler | ................. | B60N 2/502 |
| 11,167,669 | B2 | | 11/2021 | Sekizuka | | |
| 11,685,298 | B2 | * | 6/2023 | Dotzler | ................... | B60N 2/501 |
| | | | | | | 248/584 |
| 2011/0226930 | A1 | * | 9/2011 | Enns | ..................... | B60N 2/509 |
| | | | | | | 248/588 |
| 2011/0284713 | A1 | * | 11/2011 | Ellerich | ................. | B60N 2/508 |
| | | | | | | 248/421 |
| 2016/0214658 | A1 | * | 7/2016 | Haller | .................... | B60N 2/502 |
| 2016/0288752 | A1 | | 10/2016 | Stancato et al. | | |
| 2020/0108748 | A1 | * | 4/2020 | Sekizuka | ............. | A47C 31/126 |

FOREIGN PATENT DOCUMENTS

EP 2025554 B1 11/2012

* cited by examiner

*Primary Examiner* — Faye M Fleming
(74) *Attorney, Agent, or Firm* — Frank A. Mackenzie; Bejin Bieneman PLC

(57) ABSTRACT

An assembly includes a seat bottom, a scissor mechanism, and a pyrotechnic actuator. The seat bottom includes a rear seat cushion and a front seat cushion in a seat-forward direction from the rear seat cushion. The rear seat cushion is movable between a raised position and a lowered position relative to the front seat cushion. The scissor mechanism is coupled to the rear seat cushion and movable between an extended position and a compressed position. The scissor mechanism in the extended position holds the rear seat cushion at the raised position. The scissor mechanism in the compressed position holds the rear seat cushion at the lowered position. The pyrotechnic actuator is connected to the rear seat cushion and dischargeable to move the rear seat cushion from the raised position to the lowered position.

20 Claims, 7 Drawing Sheets

VEHICLE SEAT WITH RESTRAINT SYSTEM

BACKGROUND

Vehicles include restraint systems. The restraint system for a seat of a vehicle is typically a three-point harness. The restraint system includes an anchor, a retractor, and a buckle. The anchor attaches one end of the webbing to a body structure of the vehicle. The other end of the webbing feeds into the retractor, which may include a spool that extends and retracts the webbing. A clip slides freely along the webbing and, when engaged with the buckle, divides the webbing into a lap band and a shoulder band.

DETAILED DESCRIPTION

Figure 1:
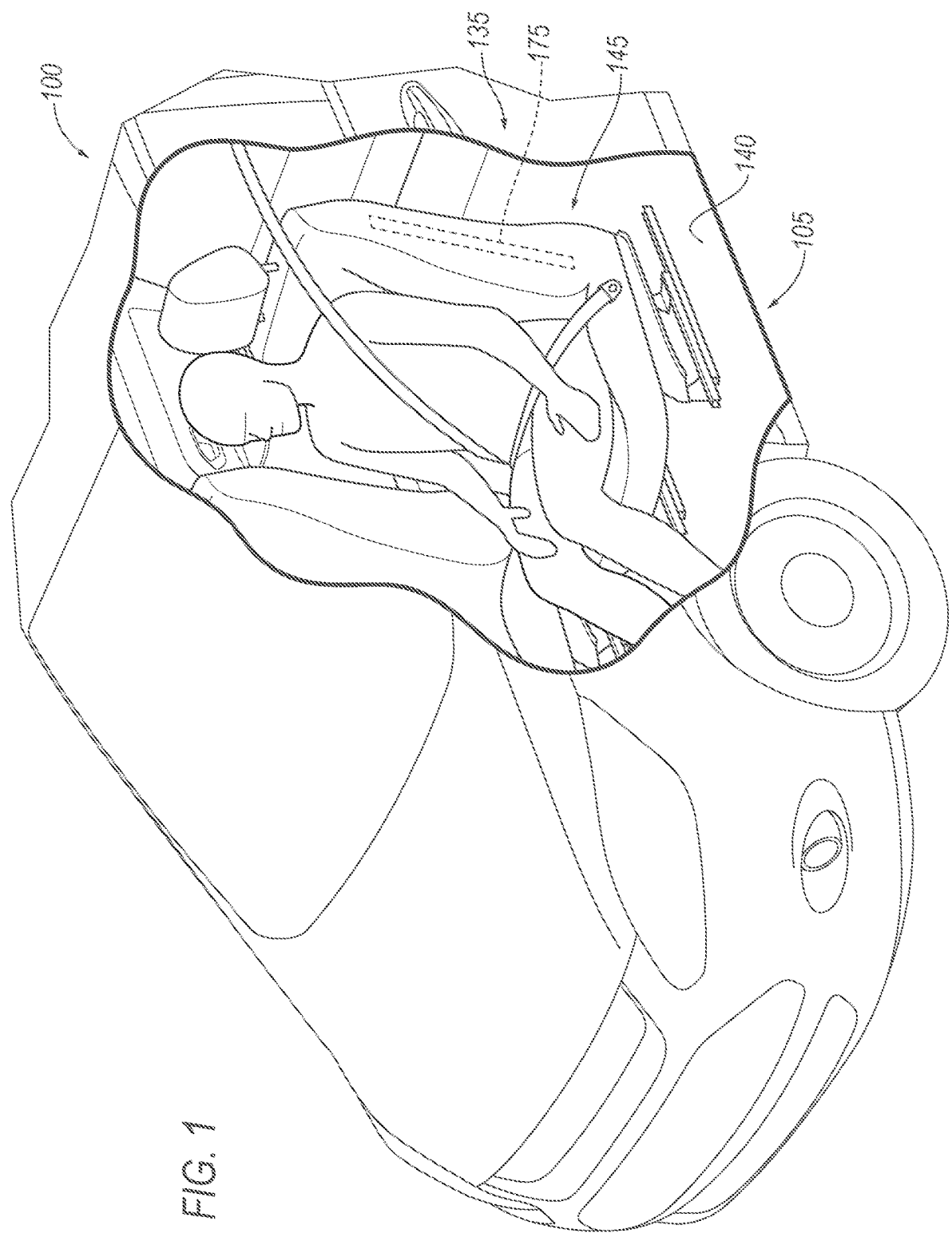
FIG. 1 is a perspective view of a portion of an example vehicle with a passenger compartment exposed for illustration.

An assembly includes a seat bottom, a scissor mechanism, and a pyrotechnic actuator. The seat bottom includes a rear seat cushion and a front seat cushion in a seat-forward direction from the rear seat cushion. The rear seat cushion is movable between a raised position and a lowered position relative to the front seat cushion. The scissor mechanism is coupled to the rear seat cushion and movable between an extended position and a compressed position. The scissor mechanism in the extended position holds the rear seat cushion at the raised position. The scissor mechanism in the compressed position holds the rear seat cushion at the lowered position. The pyrotechnic actuator is connected to the rear seat cushion and dischargeable to move the rear seat cushion from the raised position to the lowered position.

In an example, the front seat cushion may be arranged to maintain a constant position when the rear seat cushion moves from the raised position to the lowered position.

In an example, the assembly may further include a track supported by the front seat cushion, the rear seat cushion being engaged with the track and movable along the track between the raised position and the lowered position.

In an example, the assembly may further include a seat back coupled to the seat bottom in a seat-rearward direction from the rear seat cushion. In a further example, the assembly may further include an airbag supported by the seat back and inflatable to an inflated position above the seat bottom. In a yet further example, the seat back may have a top half, and the airbag may extend from the top half in the inflated position. In a still yet further example, the seat back may have a bottom half at the seat bottom and a midpoint dividing the top half and the bottom half, and the airbag may extend below the midpoint in the inflated position.

In another yet further example, the airbag may be configured to inflate together with the pyrotechnic actuator discharging.

In an example, the scissor mechanism may include a first crossmember pivotally coupled to the rear seat cushion and a second crossmember pivotally coupled to the rear seat cushion. In a further example, the assembly may further include a floor, and the first crossmember and the second crossmember may be pivotally coupled to the floor.

In another further example, the seat bottom may include a seat pan, and the first crossmember and the second crossmember may be pivotally coupled to the seat pan.

In another further example, the first crossmember and the second crossmember may be pivotally engaged with each other.

In an example, the assembly may further include a floor, and the scissor mechanism may be mounted to the floor. In a further example, the pyrotechnic actuator may include a first end fixed to one of the scissor mechanism or the rear seat cushion and a second end fixed to the floor.

In an example, the seat bottom may include a seat pan, and the scissor mechanism may be mounted to the seat pan. In a further example, the pyrotechnic actuator may include a first end fixed to one of the scissor mechanism or the rear seat cushion and a second end fixed to the seat pan.

In an example, the pyrotechnic actuator may include a first end fixed to the scissor mechanism.

In an example, the pyrotechnic actuator may include a first end fixed to the rear seat cushion.

In an example, the assembly may further include a plate fixed to a bottom surface of the rear seat cushion, the plate being movable with the rear seat cushion from the raised position to the lowered position. In a further example, the plate may be mounted to the scissor mechanism.

With reference to the Figures, wherein like numerals indicate like parts throughout the several views, an assembly 105 of a vehicle 100 includes a seat bottom 110, a scissor mechanism 115, and a pyrotechnic actuator 120. The seat bottom 110 includes a rear seat cushion 125 and a front seat cushion 130 in a seat-forward direction from the rear seat cushion 125. The rear seat cushion 125 is movable between a raised position and a lowered position relative to the front seat cushion 130. The scissor mechanism 115 is coupled to the rear seat cushion 125 and movable between an extended position and a compressed position. The scissor mechanism 115 in the extended position holds the rear seat cushion 125 at the raised position. The scissor mechanism 115 in the compressed position holds the rear seat cushion 125 at the lowered position. The pyrotechnic actuator 120 is connected to the rear seat cushion 125 and dischargeable to move the rear seat cushion 125 from the raised position to the lowered position.

The raised position of the rear seat cushion 125 may be a default position at which a top surface of the rear seat cushion 125 is contiguous with a top surface of the front seat cushion 130. In the lowered position of the rear seat cushion 125, the top surface of the rear seat cushion 125 is below the top surface of the front seat cushion 130. In the event of certain impacts to the vehicle 100, the pyrotechnic actuator 120 is triggered to discharge to move the rear seat cushion 125 from the raised position to the lowered position. The lowered position of the rear seat cushion 125 permits the pelvis of the occupant to drop below the top surface of front seat cushion 130, and the front seat cushion 130 may thereby reduce forward travel by the occupant.

With reference to FIG. 1, the vehicle 100 may be any passenger or commercial automobile such as a car, a truck, a sport utility vehicle, a crossover, a van, a minivan, a taxi, a bus, etc.

The vehicle 100 includes a passenger compartment 135 to house occupants of the vehicle 100. The passenger compartment 135 includes a floor 140 and a plurality of seats 145 mounted to the floor 140. One or more of the seats 145 may be disposed in a front row of the passenger compartment 135, and one or more of the seats 145 may be disposed in a second row behind the front row. The passenger compartment 135 may also include seats 145 in a third row at a rear of the passenger compartment 135. The rest of this description discusses the assembly 105 for one seat 145, but multiple or all seats 145 in the passenger compartment 135 can each have an assembly 105 as described herein. The seats 145 are shown to be bucket seats in the front row and bench seats in the second row, but the seats 145 may be other types. The position and orientation of the seats 145 and components thereof may be adjustable by an occupant.

Figure 2:
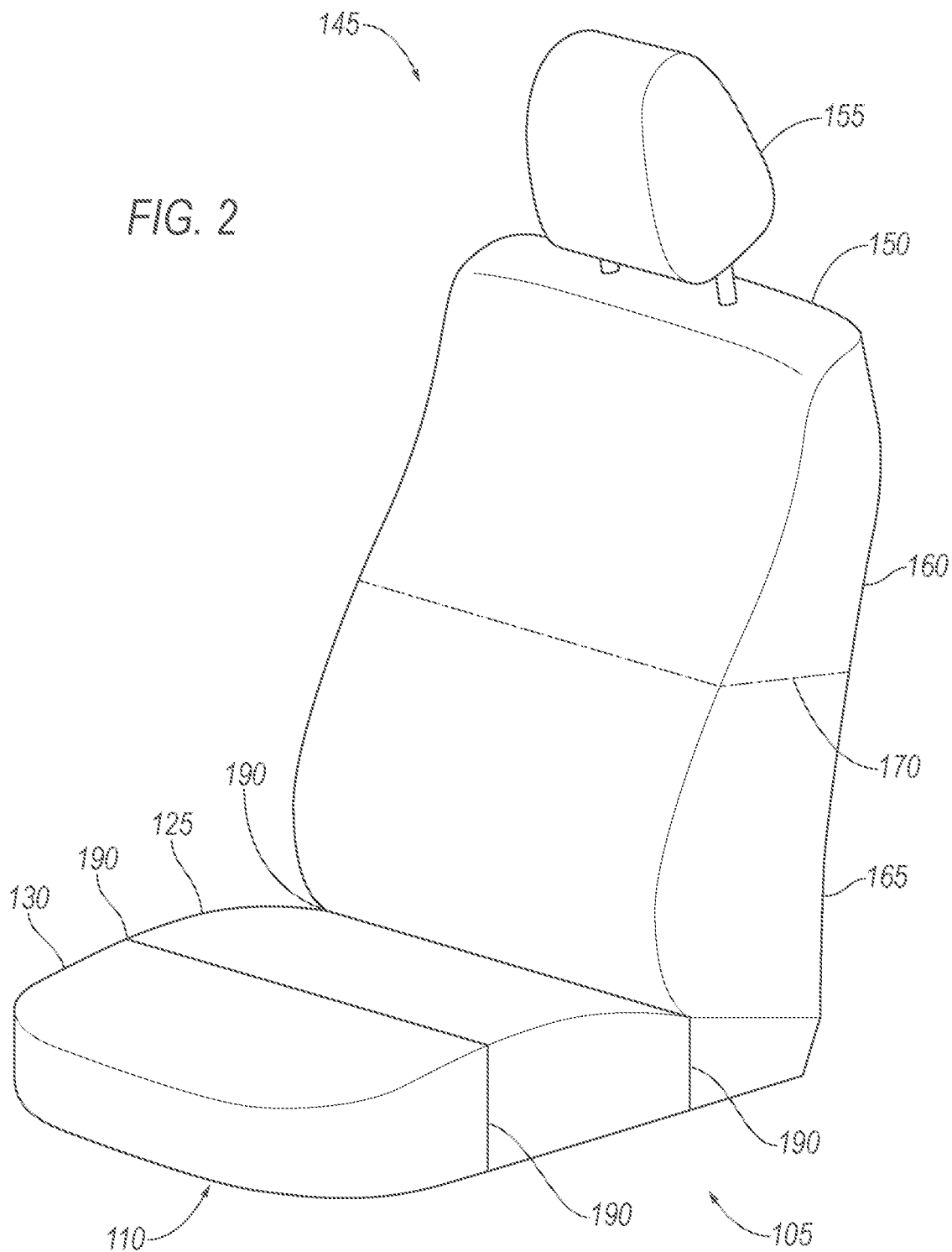
FIG. 2 is a perspective view of an example seat of the vehicle.

With reference to FIG. 2, the seat 145 may include a seat back 150, the seat bottom 110, and a head restraint 155. The head restraint 155 may be supported by the seat back 150 and may be stationary or movable relative to the seat back 150. The seat back 150 may be supported by the seat bottom 110. The seat back 150 may be coupled to the seat bottom 110 in a seat-rearward direction from the rear seat cushion 125. The seat back 150 may be stationary or movable relative to the seat bottom 110. The seat back 150, the seat bottom 110, and/or the head restraint 155 may be adjustable in multiple degrees of freedom. Specifically, the seat back 150, the seat bottom 110, and/or the head restraint 155 may themselves be adjustable, in other words, adjustable components within the seat back 150, the seat bottom 110, and/or the head restraint 155, and/or may be adjustable relative to each other.

The seat back 150 may be divided into a top half 160 and a bottom half 165 along a length of the seat back 150 extending perpendicular to an axis of rotation of the seat back 150 relative to the seat bottom 110. The bottom half 165 is at the seat bottom 110, and the top half 160 is spaced from the seat bottom 110 by the bottom half 165. A midpoint 170 divides the top half 160 and the bottom half 165.

Figure 3A:
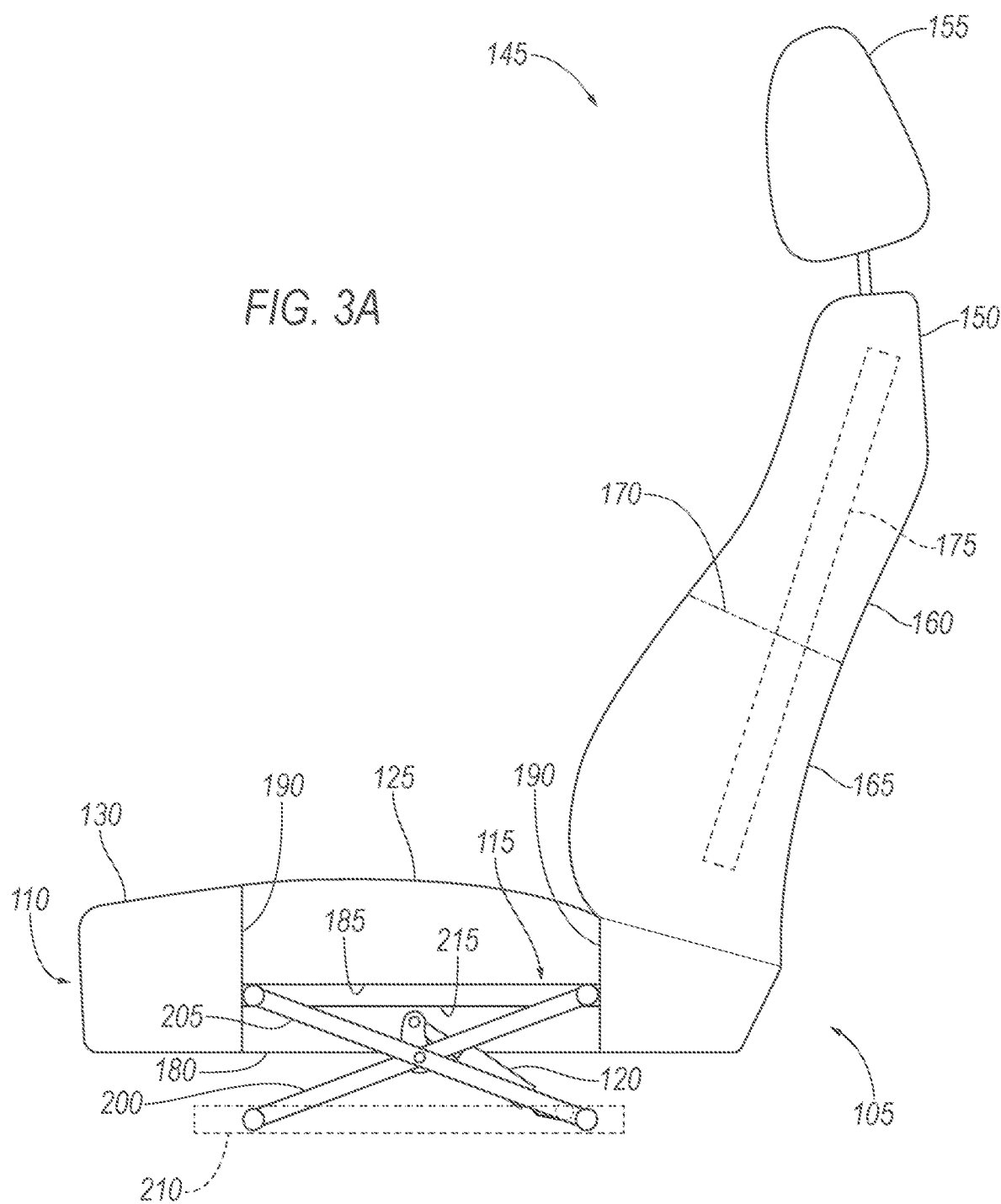
FIG. 3A is a side view of the seat with a rear seat cushion in a raised position and an airbag in an uninflated position.
Figure 3B:
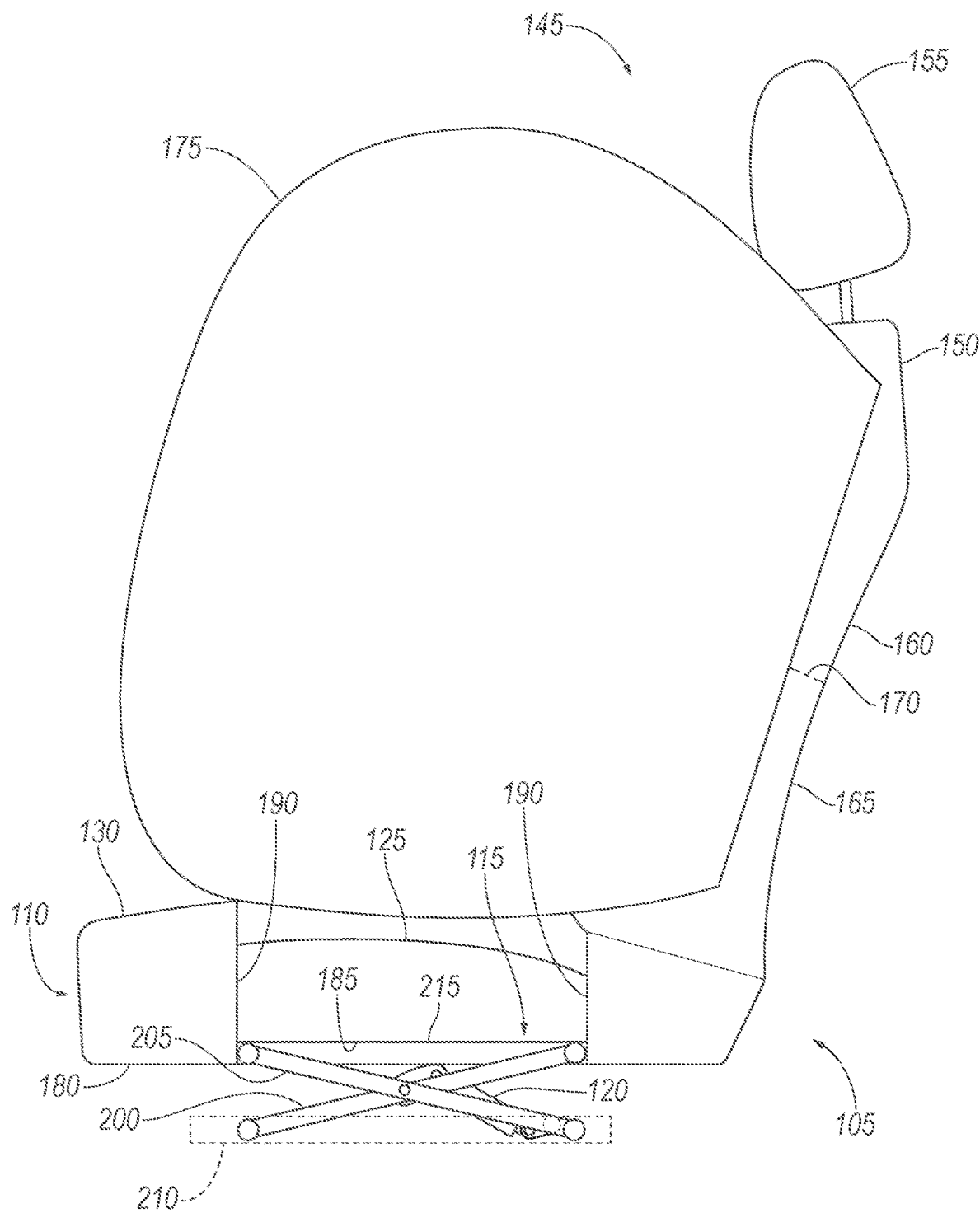
FIG. 3B is a side view of the seat with the rear seat cushion in a lowered position and the airbag in the inflated position.

With reference to FIGS. 3A-B, the assembly 105 may include an airbag 175. The airbag 175 is supported by the seat back 150. The airbag 175 is inflatable from an uninflated position inside the seat back 150 (as shown in FIG. 3A) to an inflated position extending above the seat bottom 110 and outward from the seat back 150 (as shown in FIG. 3B). The airbag 175 in the uninflated position is located inside or underneath a covering of the seat back 150. The covering may include one or more tearaway seams that are opened by the inflation of the airbag 175. The airbag 175 in the inflated position is positioned laterally from an occupant sitting in the seat 145, e.g., between the occupant and a door of the vehicle 100 in a cross-vehicle direction, e.g., an outboard direction. The airbag 175 in the inflated position extends from the top half 160 of the seat back 150 and extends below the midpoint 170, e.g., extends from the bottom half 165 of the seat back 150, thereby providing coverage for a torso of the occupant. For example, the airbag 175 in the inflated position may extend straight forward from the side of the seat back 150 from which the airbag 175 inflated. For another example, the airbag 175 may extend beside and in front of the occupant, e.g., curling around the front of the occupant. The assembly 105 may include symmetrical airbags 175 on both sides of the seat back 150. The airbag 175 may include an inflator for inflating the airbag 175 with an inflation medium, such as a gas.

The seat bottom 110 includes a seat pan 180, the front seat cushion 130, the rear seat cushion 125, a plate 185, and at least one track 190. The seat pan 180 may be part of a seat frame of the seat 145. The seat pan 180 extends below the front seat cushion 130 and the rear seat cushion 125. The seat pan 180 supports the front seat cushion 130, the rear seat cushion 125, the plate 185, and the at least one track 190.

The front seat cushion 130 is positioned in a seat-forward direction from the rear seat cushion 125. The front seat cushion 130 extends laterally, i.e., in a cross-seat direction, for the full width of the seat 145, thereby providing coverage under both thighs of the occupant. The front seat cushion 130 is arranged to maintain a constant position when the rear seat cushion 125 moves from the raised position to the lowered position. For example, the front seat cushion 130 may be mounted to the seat pan 180 and fixed relative to the seat pan 180. The front seat cushion 130 may include cushions or padding covered with upholstery. The cushions may be made of cushioning material, e.g., foam or any other suitable supportive material. The upholstery may be formed of cloth, leather, faux leather, or any other suitable material. The upholstery may be stitched in panels around the foam.

The rear seat cushion 125 is movable between the raised position and the lowered position relative to the front seat cushion 130. In the raised position, a top surface of the rear seat cushion 125 is contiguous with a top surface of the front seat cushion 130, e.g., the top surfaces may form a sufficiently continuous surface to serve as a seating area for the occupant to sit on in a normal sitting position. In the lowered position, the top surface of the rear seat cushion 125 is fully below the top surface of the front seat cushion 130, and the rear seat cushion 125 forms a recess relative to the front seat cushion 130. When an occupant is seated in the seat 145, the pelvis of the occupant may drop into the recess, and the thighs of the occupant may be raised by the relatively higher position of the front seat cushion 130. The movement of the rear seat cushion 125 between the raised position and the lowered position is distinct from the adjustability of the seat 145. The rear seat cushion 125 may include cushions or padding covered with upholstery, similar to the front seat cushion 130. The rear seat cushion 125 extends laterally, i.e., in the cross-seat direction, for the full width of the seat 145, thereby providing coverage for the full width of the pelvis of the occupant.

The plate 185 is fixed to a bottom surface of the rear seat cushion 125. The plate 185 is movable with the rear seat cushion 125 between the raised position and the lowered position. For example, the plate 185 may be fixed relative to the rear seat cushion 125 and may support the rear seat cushion 125. The plate 185 may serve as a mounting platform connecting the rear seat cushion 125 to the scissor mechanism 115.

The tracks 190 facilitate movement of the rear seat cushion 125 relative to the front seat cushion 130. The tracks 190 are supported by the front seat cushion 130 and the seat pan 180 and may be mounted to the front seat cushion 130. The tracks 190 may be elongated generally vertically, e.g., at least 45° from horizontal. The tracks 190 are elongated parallel to each other. The tracks 190 may be positioned at corners of the rear seat cushion 125 as viewed from above. The tracks 190 may have a uniform cross-section projected along the directions of elongation to facilitate components engaging with and sliding along the tracks 190. In particular, the rear seat cushion 125 engages with the tracks 190 and is movable, e.g., slidable, along the tracks 190 between the raised position and the lowered position.

Figure 4:
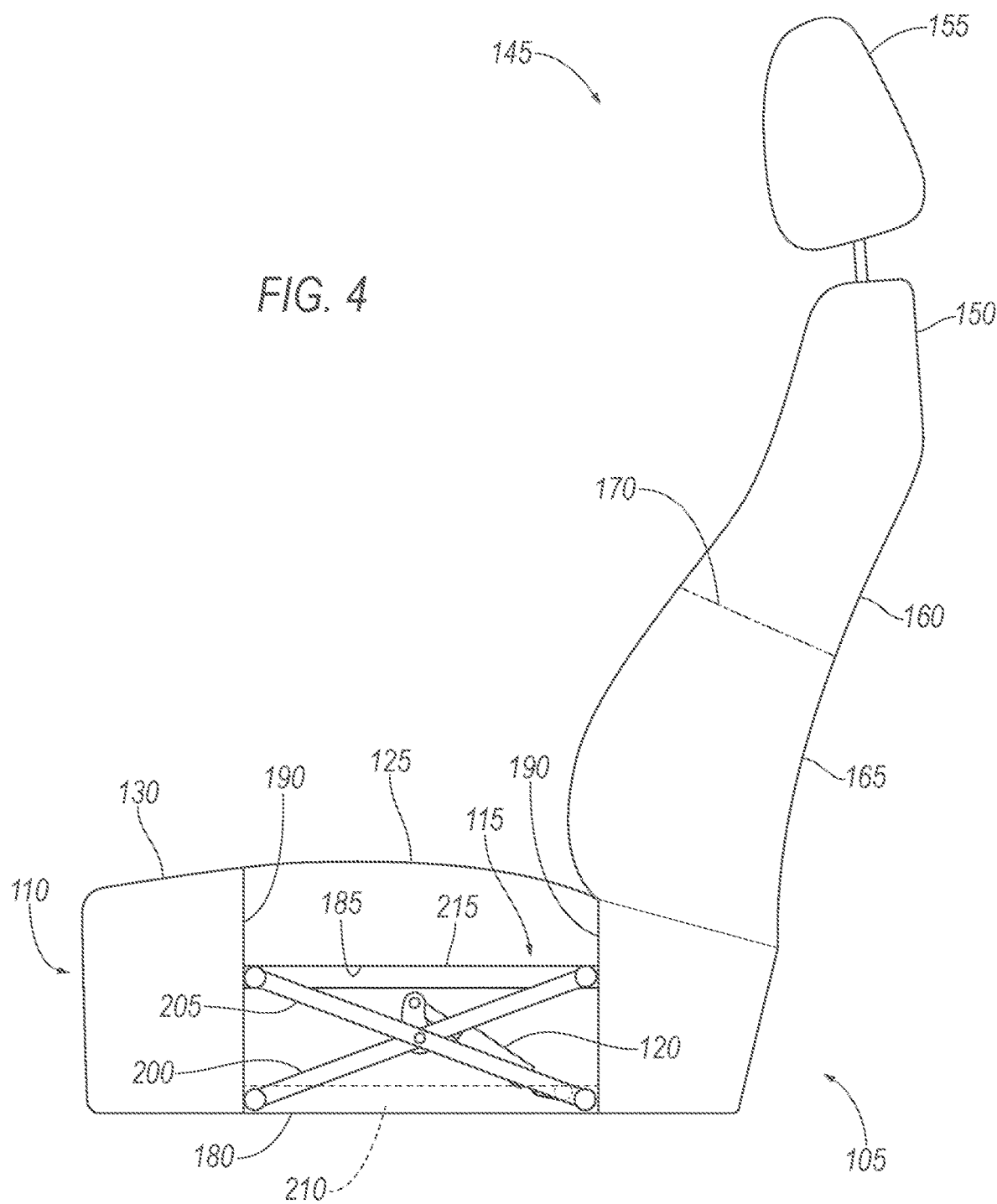
FIG. 4 is a side view of another example of the seat with the rear seat cushion in the raised position.

With reference to FIGS. 3A-4, the assembly 105 includes the scissor mechanism 115. The scissor mechanism 115 is mounted to and supported by a component relative to which the rear seat cushion 125 is movable. In particular, the scissor mechanism 115 may be mounted to the floor 140 (as shown in FIGS. 3A-B) or to the seat pan 180 (as shown in FIG. 4). The scissor mechanism 115 is coupled to the rear seat cushion 125 and supports the rear seat cushion 125. For example, the plate 185 may be mounted to the scissor mechanism 115.

Figure 5A:
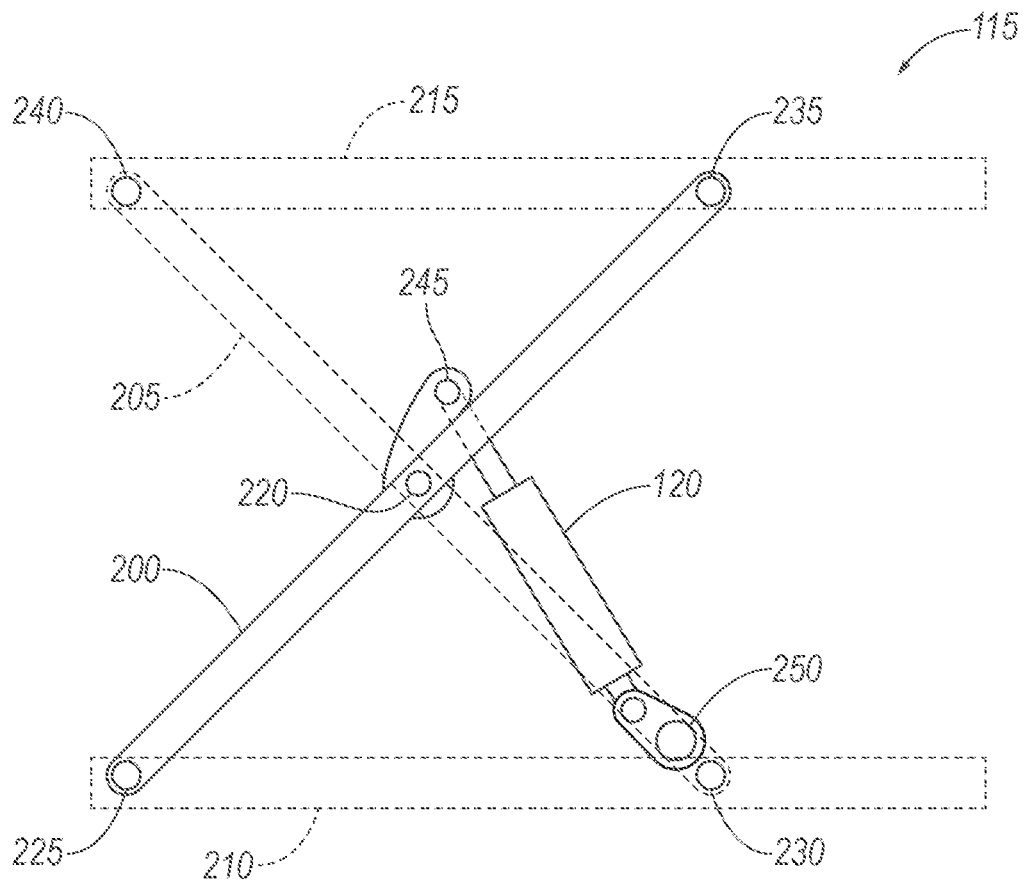
FIG. 5A is a side view of a scissor mechanism of the seat in an extended position.
Figure 5B:
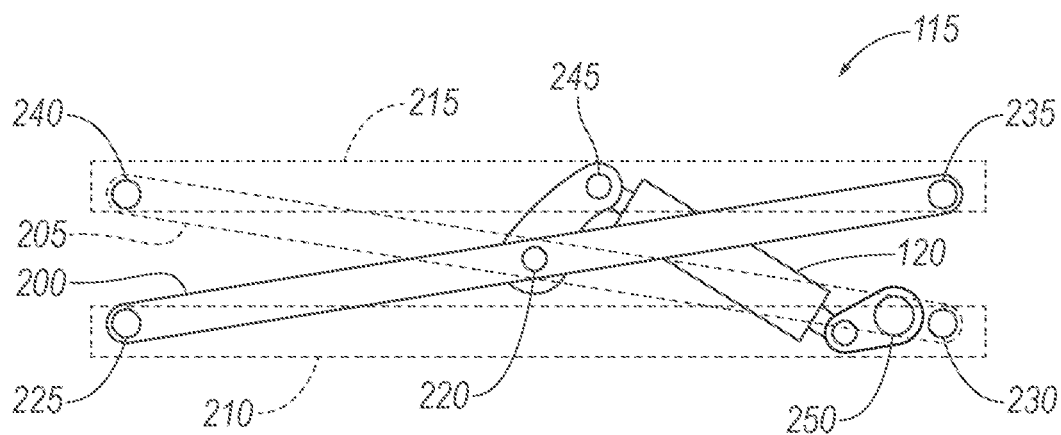
FIG. 5B is a side view of the scissor mechanism in a compressed position.

With reference to FIGS. 5A-B, the scissor mechanism 115 includes a first crossmember 200, a second crossmember 205, a first scissor track 210, and a second scissor track 215. The first crossmember 200 and the second crossmember 205 are pivotally engaged with each other at a middle pivot 220, thereby forming the scissor mechanism 115. The first crossmember 200 and the second crossmember 205 are pivotally coupled to the component to which the scissor mechanism 115 is mounted, e.g., the floor 140 or the seat pan 180. For example, the first scissor track 210 is mounted to the floor 140 or the seat pan 180, and lower pivotal ends 225, 230 of the first crossmember 200 and the second crossmember 205 are coupled to the first scissor track 210. The lower pivotal end 230 of the second crossmember 205 may be slidably engaged with the first scissor track 210, and the lower pivotal end 225 of the first crossmember 200 may be fixed relative to the first scissor track 210. The first crossmember 200 and the second crossmember 205 are pivotally coupled to the rear seat cushion 125, e.g., to the plate 185. For example, the second scissor track 215 is mounted on an underside of the plate 185, and upper pivotal ends 235, 240 of the first crossmember 200 and the second crossmember 205 are coupled to the second scissor track 215. The upper pivotal end 235 of the first crossmember 200 may be slidably engaged with the second scissor track 215, and the upper pivotal end 240 of the second crossmember 205 may be fixed relative to the second scissor track 215.

The scissor mechanism 115 is movable between an extended position (shown in FIG. 5A) and a compressed position (shown in FIG. 5B). The scissor mechanism 115 in the extended position holds the rear seat cushion 125 at the raised position, and the scissor mechanism 115 in the compressed position holds the rear seat cushion 125 at the lowered position. The scissor mechanism 115 moves from the extended position to the compressed position by the lower pivotal end 230 of the second crossmember 205 sliding along the first scissor track 210 and the upper pivotal end 235 of the first crossmember 200 sliding along the second scissor track 215, while the crossmembers 200, 205 pivot at the pivotal ends 225, 230, 235, 240 from a comparatively more vertical position to a comparatively more horizontal position, thereby bringing the first scissor track 210 and the second scissor track 215 closer together.

Figure 6:
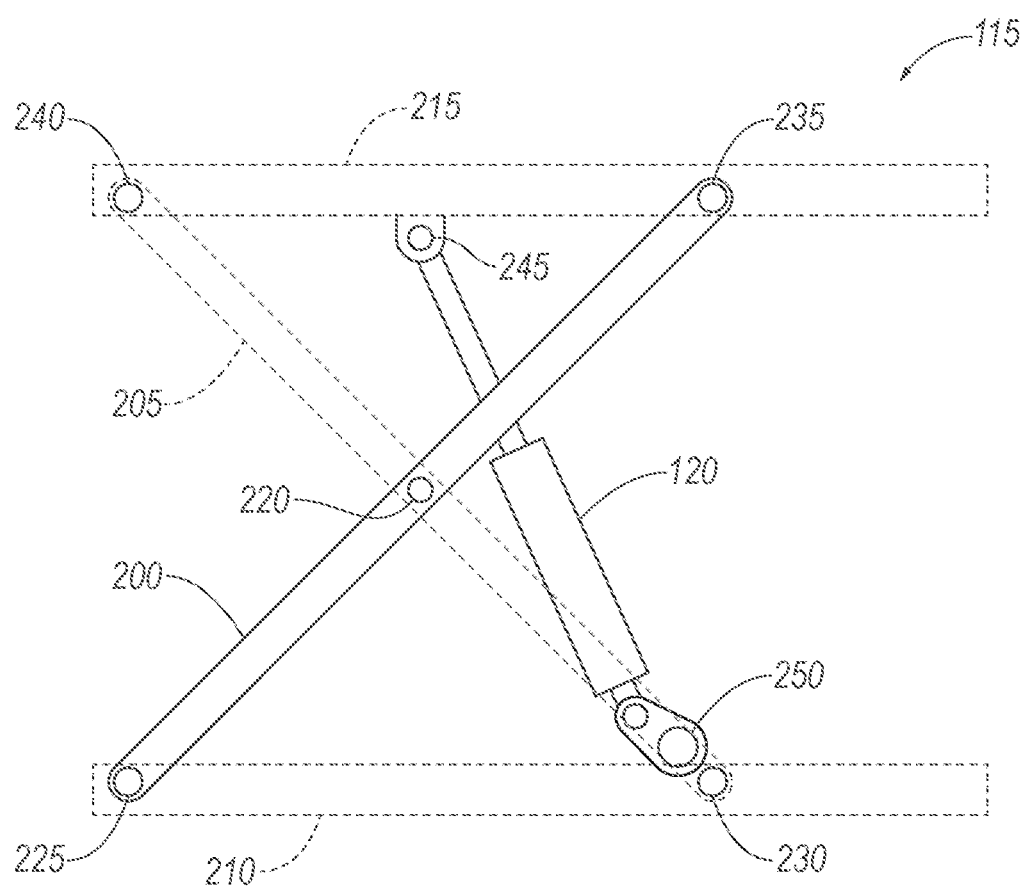
FIG. 6 is a side view of another example of the scissor mechanism in the extended position.

With reference to FIGS. 5A-6, the assembly 105 includes the pyrotechnic actuator 120 extending from a first end 245 to a second end 250. The pyrotechnic actuator 120 is dischargeable to bring the first end 245 and the second end 250 closer together. The pyrotechnic actuator 120 includes an explosive charge positioned to drive the first end 245 and the second end 250 closer together, e.g., by driving a piston into a cylinder. The charge may be combustible to produce a gas. The charge may be formed of a solid mixture of substances that, when ignited, react to produce the gas. For example, the charge may be formed of sodium azide ($NaNO_3$), potassium nitrate ($KNO_3$), and silicon dioxide ($SiO_2$), which react to form nitrogen gas ($N_2$).

The pyrotechnic actuator 120 is dischargeable to move the rear seat cushion 125 from the raised position to the lowered position. The pyrotechnic actuator 120 is connected to the rear seat cushion 125 and to the floor 140 or seat pan 180 so as to pull the rear seat cushion 125 toward the floor 140 or the seat pan 180. For example, the first end 245 may be fixed either to the rear seat cushion 125, e.g., via the second scissor track 215 (as shown in FIG. 6), or to the scissor mechanism 115, e.g., the middle pivot 220 (as shown in FIGS. 5A-B). In either case, the second end 250 may be fixed to the floor 140 or the seat pan 180, e.g., via the first scissor track 210. As another alternative (not shown), the first end 245 may be fixed to the rear seat cushion 125, and the second end 250 may be fixed to the scissor mechanism 115, e.g., the middle pivot 220.

The scissor mechanism 115 is in the extended position by default, and the rear seat cushion 125 is thereby in the raised position by default. In the event of certain impacts, an impact sensor may detect the certain impacts and transmit a signal to a controller, which in turn may transmit a signal to the pyrotechnic actuator 120. The pyrotechnic actuator 120 discharges, thereby moving the scissor mechanism 115 from the extended position to the compressed position and the rear seat cushion 125 from the raised position to the lowered position. The pelvis of the occupant of the seat may drop with the rear seat cushion 125, and the front seat cushion 130 may be located in front of the pelvis and may provide some constraint on forward motion by the pelvis. The airbag 175 may be configured to inflate together with the pyrotechnic actuator 120 discharging, e.g., based on a common signal or simultaneous signal from the controller. The airbag 175 may restrict lateral motion of the occupant, e.g., outboard motion. The airbag 175 may help keep the occupant laterally centered on the seat 145, which may be a position for which the front seat cushion 130 may constrain the occupant from some forward motion.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Terms such as "front," "forward," "back," "rearward," "left," "right," "lateral," etc., are understood relative to the seat 145. Many modifications and variations of the present disclosure are possible in light of the above teachings, and the disclosure may be practiced otherwise than as specifically described. Operations, systems, and methods described herein should always be implemented and/or performed in accordance with an applicable owner's/user's manual and/or safety guidelines.

What is claimed is:

1. An assembly comprising:
 a seat bottom, the seat bottom including a rear seat cushion and a front seat cushion in a seat-forward direction from the rear seat cushion, the rear seat cushion movable between a raised position and a lowered position relative to the front seat cushion;
 a scissor mechanism coupled to the rear seat cushion and movable between an extended position and a compressed position, the scissor mechanism in the extended position holding the rear seat cushion at the raised position, the scissor mechanism in the compressed position holding the rear seat cushion at the lowered position; and a pyrotechnic actuator connected to the rear seat cushion and dischargeable to move the rear seat cushion from the raised position to the lowered position.

2. The assembly of claim 1, wherein the front seat cushion is arranged to maintain a constant position when the rear seat cushion moves from the raised position to the lowered position.

3. The assembly of claim 1, further comprising a track supported by the front seat cushion, the rear seat cushion being engaged with the track and movable along the track between the raised position and the lowered position.

4. The assembly of claim 1, further comprising a seat back coupled to the seat bottom in a seat-rearward direction from the rear seat cushion.

5. The assembly of claim 4, further comprising an airbag supported by the seat back and inflatable to an inflated position above the seat bottom.

6. The assembly of claim 5, wherein the seat back has a top half, and the airbag extends from the top half in the inflated position.

7. The assembly of claim 6, wherein the seat back has a bottom half at the seat bottom and a midpoint dividing the top half and the bottom half, and the airbag extends below the midpoint in the inflated position.

8. The assembly of claim 5, wherein the airbag is configured to inflate together with the pyrotechnic actuator discharging.

9. The assembly of claim 1, wherein the scissor mechanism includes a first crossmember pivotally coupled to the rear seat cushion and a second crossmember pivotally coupled to the rear seat cushion.

10. The assembly of claim 9, further comprising a floor, wherein the first crossmember and the second crossmember are pivotally coupled to the floor.

11. The assembly of claim 9, wherein the seat bottom includes a seat pan, and the first crossmember and the second crossmember are pivotally coupled to the seat pan.

12. The assembly of claim 9, wherein the first crossmember and the second crossmember are pivotally engaged with each other.

13. The assembly of claim 1, further comprising a floor, wherein the scissor mechanism is mounted to the floor.

14. The assembly of claim 13, wherein the pyrotechnic actuator includes a first end fixed to one of the scissor mechanism or the rear seat cushion and a second end fixed to the floor.

15. The assembly of claim 1, wherein the seat bottom includes a seat pan, and the scissor mechanism is mounted to the seat pan.

16. The assembly of claim 15, wherein the pyrotechnic actuator includes a first end fixed to one of the scissor mechanism or the rear seat cushion and a second end fixed to the seat pan.

17. The assembly of claim 1, wherein the pyrotechnic actuator includes a first end fixed to the scissor mechanism.

18. The assembly of claim 1, wherein the pyrotechnic actuator includes a first end fixed to the rear seat cushion.

19. The assembly of claim 1, further comprising a plate fixed to a bottom surface of the rear seat cushion, the plate being movable with the rear seat cushion from the raised position to the lowered position.

20. The assembly of claim 19, wherein the plate is mounted to the scissor mechanism.

\* \* \* \* \*